United States Patent
Dawson

(10) Patent No.: US 9,417,146 B2
(45) Date of Patent: Aug. 16, 2016

(54) SENSOR DEVICE AND RELATED OPERATING METHODS

(75) Inventor: Chad S. Dawson, Queen Creek, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 687 days.

(21) Appl. No.: 13/479,168

(22) Filed: May 23, 2012

(65) Prior Publication Data

US 2013/0317772 A1   Nov. 28, 2013

(51) Int. Cl.
*G01D 1/00* (2006.01)
*G01L 9/06* (2006.01)
*G01L 27/00* (2006.01)

(52) U.S. Cl.
CPC .............. *G01L 9/065* (2013.01); *G01L 27/002* (2013.01)

(58) Field of Classification Search
CPC ..................................................... G01L 19/00
USPC .............................................. 702/98, 127, 85
See application file for complete search history.

(56) References Cited

U.S. PATENT DOCUMENTS

| | | | | | |
|---|---|---|---|---|---|
| 4,192,005 | A | * | 3/1980 | Kurtz ............................... | 702/98 |
| 4,226,125 | A | * | 10/1980 | Waugh ............................ | 73/708 |
| 4,765,188 | A | * | 8/1988 | Krechmery et al. ............. | 73/708 |
| 5,307,683 | A | * | 5/1994 | Phelps et al. .................... | 73/708 |
| 5,764,541 | A | * | 6/1998 | Hermann et al. ................ | 702/98 |
| 7,577,539 | B2 | * | 8/2009 | Hubanks et al. ................ | 702/104 |
| 2008/0027667 | A1 | * | 1/2008 | Petersen et al. ................. | 702/104 |

OTHER PUBLICATIONS

Measurement Specialties, "MS5534C (RoHS) Barometer Module," www.meas-spec.com, pp. 1-21, Jan. 28, 2010.

* cited by examiner

*Primary Examiner* — Mischita Henson
*Assistant Examiner* — Stephanie Bloss

(57) ABSTRACT

Apparatus, systems, and fabrication methods are provided for sensing devices. An exemplary sensing device includes a first sensing arrangement to measure a first property and provide one or more measured values for the first property, a second sensing arrangement to measure a second property, a storage element coupled to the second sensing arrangement to maintain a stored value for the second property measured by the second sensing arrangement, and a control system coupled to the first sensing arrangement and the storage element to determine one or more calibrated measurement values for the first property using the one or more measured values for the first property from the first sensing arrangement and the stored value for the second property.

20 Claims, 2 Drawing Sheets

SENSOR DEVICE AND RELATED OPERATING METHODS

TECHNICAL FIELD

Embodiments of the subject matter described herein relate generally to sensing devices and applications, and more particularly, embodiments of the subject matter relate to sensor devices with multiple sensing arrangements for determining calibrated measurements.

BACKGROUND

Sensors are used in a variety of applications. For example, an electronic device may include a pressure sensor that is fabricated on a semiconductor die and generates electrical signals indicative of the amount of pressure exerted on the semiconductor die, which, in turn, may be utilized to determine the ambient pressure exerted on the electronic device. In practice, however, temperature sensitivity can influence electrical characteristics of the components of the pressure sensor, and accordingly, a calibrated or temperature-compensated pressure measurement is often determined using a concurrently obtained temperature measurement. Therefore, existing pressure sensing schemes often involve sensing the temperature concurrently to the pressure.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures, which are not necessarily drawn to scale.

DETAILED DESCRIPTION

Figure 1:
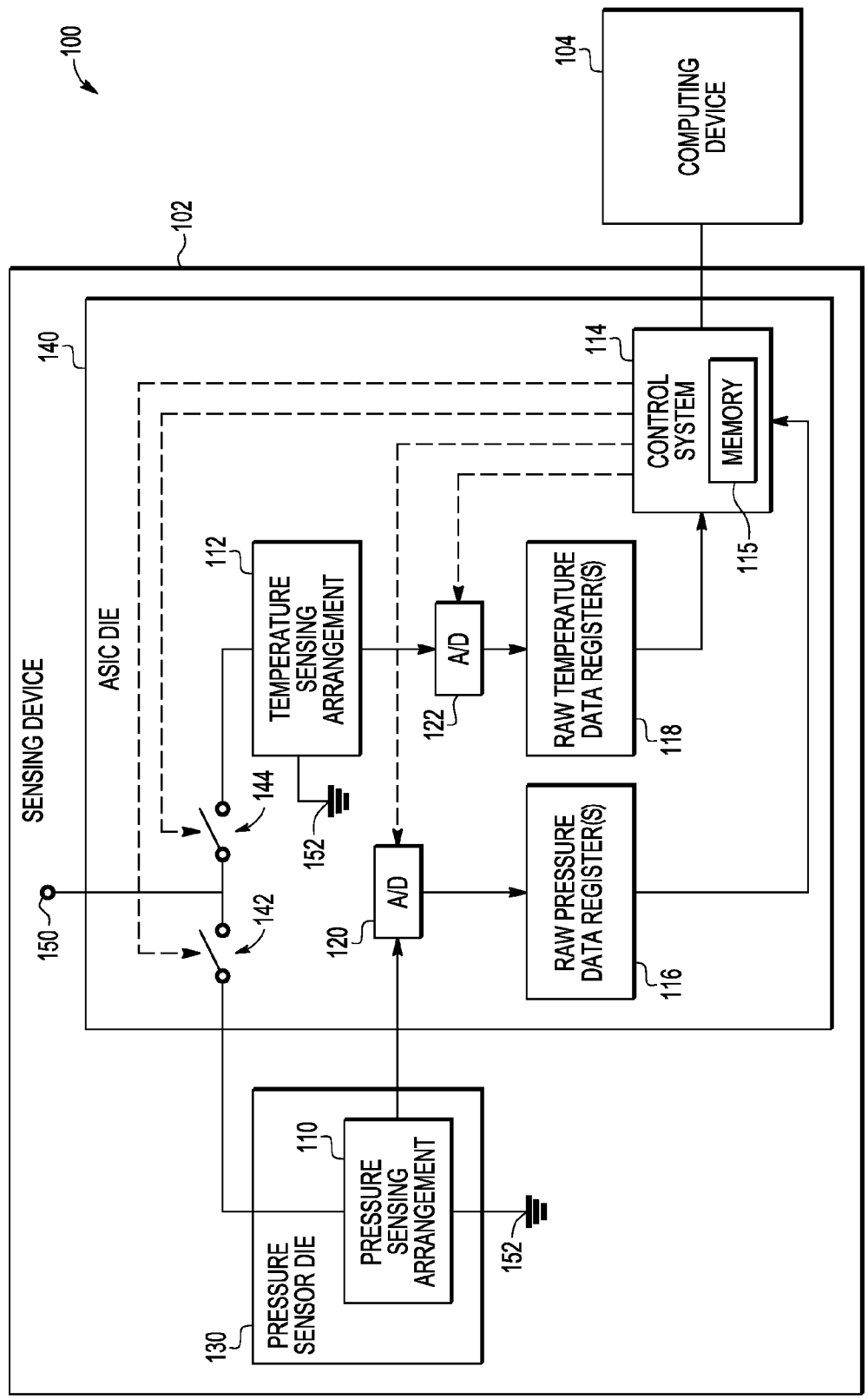
FIG. 1 is a block diagram of an exemplary sensing system in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments of the subject matter described herein relate to sensing devices that include multiple sensing arrangements and are capable of determining calibrated measurement values by using a raw measurement value previously obtained using one sensing arrangement to influence or otherwise adjust a raw measurement value obtained using another sensing arrangement. As described in greater detail below, an exemplary sensing device includes a data storage element that is capable of storing or otherwise maintaining old raw measurement values obtained using one sensing arrangement at a prior sampling time, wherein in response to a request for an updated calibrated measurement corresponding to the physical property sensed or measured by the other sampling arrangement, the other sampling arrangement is operated at that subsequent sampling time to obtain new (or updated) raw measurement values for that physical property. The updated calibrated measurement for that physical property is then determined based on the new (or updated) raw measurement values for that physical property in a manner that is influenced by the old raw measurement values stored by the storage element. Thus, the other sensing arrangement that is not operated for purposes of the updated calibrated measurement may be deactivated to conserve power, and additionally, does not introduce noise into successive calibrated measurements when it is not activated. In exemplary embodiments described herein, the data storage element maintains old raw temperature measurement values obtained by operating a temperature sensing arrangement at a previous sampling time, and in response to a request for an updated calibrated pressure measurement, a pressure sensing arrangement is operated at a subsequent sampling time to obtain new (or updated) raw pressure measurement values. The updated calibrated (or temperature-compensated) pressure measurement is then determined by adjusting the new (or updated) raw pressure measurement values using the stored raw temperature measurement values from a previous sampling time.

It should be appreciated that although the subject matter is described herein in terms of using pressure and temperature sensing arrangements for purposes of determining calibrated pressure measurements, the subject matter is not intended to be limited to any particular combination of sensing arrangements or any particular calibrated measurements. For example, in alternative embodiments, a calibrated (or pressure-compensated) temperature measurement may be determined by adjusting current (or recently obtained) raw temperature measurement values using stored raw pressure measurement values from a previous sampling time. In other embodiments, the subject matter described herein may be implemented using other sensing arrangements, such as accelerometers, gyroscopes, magnetometers, or the like, for determining calibrated measurements of other physical properties. For example, a calibrated (or pressure-compensated) acceleration measurement may be determined by adjusting current (or recently obtained) raw acceleration measurement values from a MEMS accelerometer using stored raw pressure measurement values from a previous sampling time.

FIG. 1 depicts an exemplary embodiment of a sensing system 100 that includes a sensing device 102 and a computing device 104. As described in greater detail below, in exemplary embodiments, the sensing device 102 is a "calibrated" sensing device that calculates calibrated measurement values for a sensed physical property and outputs the calibrated measurement values to the computing device 104. As used herein, a "calibrated" measurement value for a physical property should be understood as referring to a measurement value for that physical property that is influenced, adjusted, or otherwise modified by a sensed (or measured) value for another physical property. In this regard, the calibrated measurement value may account for the sensitivity of a particular sensing arrangement with respect to another physical property that is not intended to be measured by that sensing arrangement or other inaccuracies exhibited the sensing arrangement. It should be understood that FIG. 1 is a simplified representation of the sensing system 100 for purposes of explanation and is not intended to limit the subject matter described herein.

The sensing device 102 includes, without limitation, a first sensing arrangement 110 configured to sense or otherwise measure a first physical property, a second sensing arrangement 112 configured to sense or otherwise measure a second physical property, and a control system 114 configured to obtain raw measurement values measured for those physical properties by the sensing arrangements 110, 112 and calculate a calibrated measurement value for a measured physical property using the raw measurement value for another physical property. For example, in exemplary embodiments, the first sensing arrangement 110 is realized as a pressure sensing arrangement configured to sense or otherwise measure an ambient pressure exerted on the sensing device 102 and the second sensing arrangement 112 is realized as a temperature sensing arrangement configured to sense or otherwise measure an ambient temperature at or near the sensing device 102, wherein the control system 114 calculates a calibrated pressure measurement value based on one or more raw pressure measurement value(s) obtained using the pressure sensing arrangement 110 and one or more raw temperature measurement value(s) obtained using the temperature sensing arrangement 112. As described above, the sensing arrangements 110, 112 are not intended to be limited to any particular type or combination of sensing arrangements, and in some embodiments, one or more of the sensing arrangements 110, 112 may be realized as an accelerometer, a gyroscope, a magnetometer, an inertial sensor, or the like. Additionally, the sensing device 102 may include one or more other sensing arrangements (e.g., an accelerometer, a gyroscope, a magnetometer, an inertial sensor, or the like) in addition to the pressure sensing arrangement 110 and the temperature sensing arrangement 112. In exemplary embodiments, the sensing device 102 includes data storage elements 116, 118 that are coupled to the output of the sensing arrangements 110, 112 (e.g., via sampling arrangements 120, 122) and configured to store raw measurement values obtained by the sensing arrangements 110, 112. Depending on the embodiment, the data storage elements 116, 118 may be realized as volatile or non-volatile storage elements. As described in greater detail below, in one operating mode, the control system 114 calculates a calibrated pressure measurement value based on more current (or recently obtained) raw pressure measurement value(s) while using older raw temperature measurement value(s) obtained using the temperature sensing arrangement 112 at a previous sampling time and stored by data storage element 118. In this regard, while the control system 114 operates the pressure sensing arrangement 110 to obtain new (or updated) raw pressure measurement values, the control system 114 may maintain the temperature sensing arrangement 112 in a deactivated state to conserve power consumed by the sensing device 102, as described in greater detail below.

In an exemplary embodiment, the pressure sensing arrangement 110 is realized as microelectromechanical systems (MEMS) pressure sensor that is formed or otherwise fabricated on a first semiconductor substrate 130 (or die). For example, a diaphragm region having a first side exposed to an ambient pressure and an opposing side exposed to a substantially fixed reference pressure may be formed in the pressure sensor die 130, wherein the pressure sensing arrangement 110 is formed or otherwise fabricated on the diaphragm region such that the pressure sensing arrangement 110 generates or otherwise produces electrical signals that are influenced by the amount of displacement or deflection of the diaphragm region, and thus, are indicative of the amount of pressure exerted on the diaphragm region by the ambient pressure relative to the reference pressure. In accordance with one embodiment, the pressure sensing arrangement 110 is realized as four piezoresistive elements configured in a Wheatstone bridge between a positive reference (or supply) voltage node and a negative reference (or ground) voltage node, wherein the displacement or deflection of the diaphragm region influences the resistances of the piezoresistive elements to produce a corresponding change in the voltage difference between a pair of output nodes of the Wheatstone bridge. The piezoresistive elements may be formed in a conventional manner, for example, by implanting ions of a desired conductivity type into the diaphragm region to form doped regions having resistances that vary with respect to the deflection of the diaphragm region. In an exemplary embodiment, the output node(s) of the Wheatstone bridge is electrically connected to the corresponding output terminal(s) (e.g., a pad or pin of the die 130) to provide an output voltage signal(s) that is indicative of the ambient pressure. As described in greater detail below, a negative reference (or ground) voltage node of the pressure sensing arrangement 110 is coupled to a node 152 configured to receive a negative (or ground) reference voltage for the sensing device 102 and the a positive reference (or supply) voltage node of the pressure sensing arrangement 110 is coupled to a node 150 configured to receive a positive reference (or supply) voltage for the sensing device 102 via a switching element 142. In this regard, the supply voltage node 150 may be electrically connected to a supply voltage input terminal (or pin or pad) of the sensing device 102 and the ground voltage node 152 may be electrically connected to a ground voltage input terminal (or pin or pad) of the sensing device 102.

In the illustrated embodiment, the sensing device 102 includes a second semiconductor substrate 140 (or die) having the temperature sensing arrangement 112, the control system 114, and the data storage elements 116, 118 formed thereon. For convenience, but without limitation, the second semiconductor substrate 140 may alternatively be referred to herein as the application-specific integrated circuit (ASIC) die by virtue of the second semiconductor substrate 140 having the control system 114 formed thereon. It should be noted that in practice, the ASIC die 140 may include additional circuitry, components, and the like configured to perform additional functions and/or processes that are not described herein. Furthermore, while FIG. 1 illustrates the temperature sensing arrangement 112, the control system 114, and the data storage elements 116, 118 being formed on a die 140 that is separate from the pressure sensor die 130, in other embodiments, the pressure sensing arrangement 110, the temperature sensing arrangement 112, the control system 114, and the data storage elements 116, 118 may be formed or fabricated on a common die.

In an exemplary embodiment, the ASIC die 140 also includes a first sampling arrangement 120, such as an analog-to-digital converter, that is coupled to the output terminal of the pressure sensor die 130 to sample the output voltage signal indicative of the ambient pressure that is generated by the pressure sensing arrangement 110 and convert the sampled voltage to a digital value representative of the pressure sensed (or measured) by the pressure sensing arrangement 110. In this regard, the digital value output by the sampling arrangement 120 corresponds to the raw pressure measurement value obtained by the pressure sensing arrangement 110. The first data storage element 116 is coupled to the output of the first sampling arrangement 120 to store or otherwise maintain the raw pressure measurement value. In an exemplary embodiment, the data storage element 116 is realized as one or more registers configured to store the most recently obtained raw pressure measurement value(s).

In an exemplary embodiment, the temperature sensing arrangement 112 is realized as a resistive bridge that is configured between a positive reference (or supply) voltage node (which is coupled to supply voltage node 150 via switching element 144) and a negative reference (or ground) voltage node (which is coupled to ground voltage node 152) and includes an output node having an output voltage signal that is indicative of the ambient temperature. Although FIG. 1 depicts the temperature sensing arrangement 112 as being fabricated on the same die 140 as the control system 114, in other embodiments, the temperature sensing arrangement 112 may be fabricated on a different die (e.g., on the pressure sensor die 130 or another die). In a similar manner as described above in the context of the pressure sensing arrangement 110, the ASIC die 140 also includes a second sampling arrangement 122 that is coupled to the output node of the temperature sensing arrangement 112 to sample the output voltage signal indicative of the ambient temperature that is generated by the temperature sensing arrangement 112 and convert the sampled voltage to a digital value representative of the temperature sensed (or measured) by the temperature sensing arrangement 112. In an exemplary embodiment, the second data storage element 118 is realized as one or more registers coupled to the output of the second sampling arrangement 122 to store or otherwise maintain the most recently obtained raw temperature measurement value(s).

Still referring to FIG. 1, in an exemplary embodiment, the ASIC die 140 also includes the switching elements 142, 144, with each switching element 142 being configured electrically in series between a supply voltage input of a respective sensing arrangement 110, 112 and the supply voltage node 150. In this regard, when a respective switching element 142, 144 is in an activated state (or alternatively, a closed or on state), the supply voltage at node 150 is provided to the respective sensing arrangement 110, 112, whereas the respective sensing arrangement 110, 112 is effectively decoupled or otherwise disconnected electrically from the supply voltage when its respective switching element 142, 144 is in a deactivated state (or alternatively, an open or off state). Thus, when a switching element 142, 144 is activated, its associated sensing arrangement 110, 112 is also activated and provides an output voltage indicative of the sensed physical property, and conversely, when a switching element 142, 144 is deactivated, its associated sensing arrangement 110, 112 is also deactivated and does not consume current (or power) from the energy source coupled to the supply voltage node 150. In practice, the switching elements 142, 144 may be realized using any suitable electrically controlled switching elements, such as, for example, transistor switches.

In the illustrated embodiment, the control system 114 generally represents the combination of circuitry, hardware, processing logic and/or other components on the ASIC die 140 that is coupled to the control inputs (e.g., gate terminals) of the switching elements 142, 144 and the sampling arrangements 120, 122 and configured to operate the switching elements 142, 144 and the sampling arrangements 120, 122 to obtain new raw measurement values for the ambient pressure and/or the temperature. Additionally, the control system 114 is coupled to the data storage elements 116, 118 to obtain sampled raw measurement values and calculate a calibrated pressure measurement value that is output to the computing device 104, as described in greater detail below in the context of FIG. 2. Depending on the embodiment, the control system 114 may be realized as a logic circuit (e.g., an ASIC), a processing core, a processing unit, a general purpose processor, a microprocessor, a microcontroller, a content addressable memory, a digital signal processor, a field programmable gate array, any suitable programmable logic device, discrete gate or transistor logic, discrete hardware components, or any combination thereof, designed to support operation of the sensing device 102 and/or perform the functions described herein. In practice, the control system 114 may also include or otherwise access a data storage element or memory 115, such as, for example, random access memory (RAM), read-only memory (ROM), flash memory, registers, or another suitable non-transitory computer-readable storage medium configured to support operation of the control system 114. For example, in some embodiments, the memory 115 may store computer-executable programming instructions that, when read and executed by the control system 114, cause the control system 114 to perform one or more additional tasks, operations, functions, and/or processes described herein. Additionally, in exemplary embodiments, the control system 114 maintains calibration information (e.g., calibration weighting coefficients or the like) for the sensing arrangements 110, 112 that stored in memory 115 and utilized when calculating a calibrated (or temperature-compensated) pressure measurement value, as described in greater detail below in the context of FIG. 2. It should be noted that although FIG. 1 depicts the memory 115 and data storage elements 116, 118 as separate components, in practice, the features and/or functionality of the data storage elements 116, 118 may be implemented by or otherwise integrated into the memory 115.

As illustrated in FIG. 1, the dies 130, 140 are encapsulated inside a single device package to provide a sensing device 102 that performs calibration (or compensation) and outputs a calibrated (or temperature-compensated) pressure measurement value at an output terminal (e.g., one or more output pads, pins, ports, or the like) that is coupled to a corresponding input of the computing device 104 (e.g., one or more input pads, pins, ports, or the like) for receiving a pressure measurement value. In this regard, the dies 130, 140 may be mounted or otherwise affixed to a lead frame or another package substrate and encapsulated with a molding compound, such as a thermosetting epoxy molding compound or the like, which fills spaces between the dies 130, 140 and protects the dies 130, 140 (and the circuitry and/or components formed thereon) from environmental elements. In an exemplary embodiment, in addition to having a supply voltage input terminal and a calibrated pressure measurement output terminal, the sensing device 102 and/or ASIC die 140 also includes input terminals coupled to the control system 114 for receiving signals from the computing device 104 indicative of a desire to obtain an updated calibrated pressure measurement value, a number of new raw pressure measurement samples to obtain and utilize when calculating the updated calibrated pressure measurement value, and/or whether to obtain any new raw temperature measurement samples when determining the updated calibrated pressure measurement value. In this regard, as described in greater detail below in the context of FIG. 2, when the sensing device 102 and/or control system 114 receives signals indicative of a desire not to obtain any new raw temperature measurement samples for the updated calibrated pressure measurement value, the control system 114 maintains the sampling arrangement 122 and the temperature sensing arrangement 112 in a deactivated state (e.g., by maintaining the switching element 144 in a deactivated state) while operating the switching element 142 and sampling arrangement 120 to obtain new raw pressure measurement values and utilizes the previously sampled raw temperature value(s) stored by the data storage element 118 for calculating the updated calibrated pressure measurement value. In other embodiments, the control system 114 may automatically determine whether or not to obtain new raw temperature measurement samples for the updated calibrated pressure measurement.

Still referring to FIG. 1, in the illustrated embodiment, the computing device 104 generally represents the circuitry, hardware, processing logic and/or other components of the sensing system 100 coupled to the input/output terminals of the sensing device 102 and/or ASIC die 140 that controls operation of the sensing device 102 and obtains the calibrated pressure measurement values from the sensing device 102, as described in greater detail below. Depending on the embodiment, the computing device 104 may include or otherwise be realized as a general purpose processor, a microprocessor, a microcontroller, a content addressable memory, a digital signal processor, a field programmable gate array, any suitable programmable logic device, discrete gate or transistor logic, discrete hardware components, or any combination thereof, designed to support operation of the sensing system 100 and/or perform additional task, functions, and/or processes described herein. In an exemplary embodiment, the computing device 104 is implemented using one or more device packages that are separate from the sensing device 102 but connected to the input/output terminals of the sensing device 102 and/or ASIC die 140 in a conventional manner (e.g., via a circuit board, wire bonds, or the like). In this regard, a lead frame or package substrate of the sensing device 102 may be separate from a lead frame or package substrate of the computing device 104.

Figure 2:
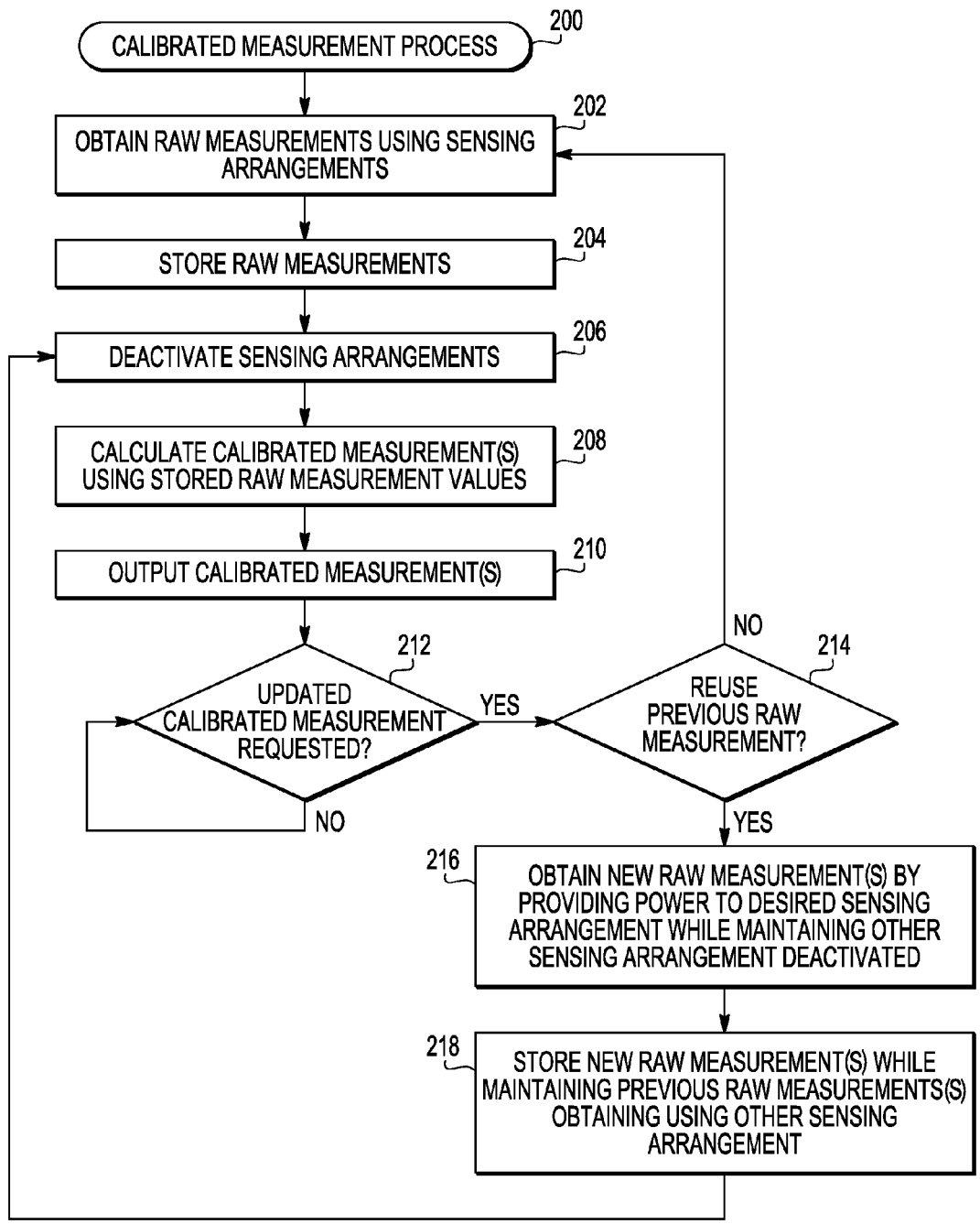
FIG. 2 is a flow diagram illustrating an exemplary calibrated measurement process suitable for implementation by the sensing system of FIG. 1 in accordance with one embodiment of the invention.

FIG. 2 depicts an exemplary embodiment of a calibrated measurement process 200 suitable for implementation by the sensing system 100 to obtain calibrated measurement values for a sensed physical property. The various tasks performed in connection with the illustrated process 200 may be performed by software executed by processing circuitry (e.g., control system 114), hardware, firmware executable by processing circuitry, or any combination thereof. For illustrative purposes, the following description may refer to elements mentioned above in connection with FIG. 1. In practice, portions of the calibrated measurement process 200 may be performed by different elements of the sensing system 100, such as, for example, the computing device 104, the control system 114, the sampling arrangements 120, 122, the switching elements 142, 144, the sensing arrangements 110, 112 and/or the data storage elements 116, 118. It should be appreciated that practical embodiments of the calibrated measurement process 200 may include any number of additional or alternative tasks, the tasks need not be performed in the illustrated order and/or the tasks may be performed concurrently, and/or the calibrated measurement process 200 may be incorporated into a more comprehensive procedure or process having additional functionality not described in detail herein. Moreover, one or more of the tasks shown and described in the context of FIG. 2 could be omitted from a practical embodiment of the calibrated measurement process 200 as long as the intended overall functionality remains intact.

In an exemplary embodiment, the calibrated measurement process 200 initializes or otherwise begins in response to receiving signals indicative of a desire to obtain a calibrated measurement for a particular physical property. For example, as described above in the context of FIG. 1, the sensing device 102 may receive input signals from the computing device 104 indicating a desire to obtain an updated calibrated pressure measurement value by obtaining a particular number of raw pressure and temperature measurements. In response to receiving signals indicative of a desire to obtain an initial calibrated measurement, the calibrated measurement process 200 continues by operating the sensing arrangements to obtain raw measurements, storing the raw measurement values, and deactivating the sensing arrangements obtaining the raw measurement values (tasks 202, 204, 206). Referring again to FIG. 1, in exemplary embodiments, the switching elements 142, 144 are initially in a deactivated state to electrically decouple the sensing arrangements 110, 112 from the supply voltage node 150, wherein in response to receiving signals from the computing device 104 indicative of a desire to obtain an initial calibrated pressure measurement value at an initial time, the control system 114 activates the switching elements 142, 144 to provide the supply voltage at node 150 to the sensing arrangements 110, 112. After activating the switching elements 142, 144, the control system 114 operates the sampling arrangements 120, 122 to obtain the indicated number of raw measurements (or samples) for pressure and temperature at or around that initial sampling time, which are then stored in the data storage elements 116, 118. For example, the computing device 104 may indicate that the calibrated pressure measurement should be calculated using 1024 raw pressure measurement values, and in response, the control system 114 operates the sampling arrangement 120 to consecutively sample the voltage output by the pressure sensing arrangement 110 to obtain 1024 raw pressure measurement values which are then stored by the data storage elements 116. Similarly, the computing device 104 may indicate that the calibrated pressure measurement should be calculated using the same number or a different number of samples than those desired for the raw pressure measurement values, and in response, the control system 114 operates the sampling arrangement 122 to consecutively sample the voltage output by the temperature sensing arrangement 112 to obtain the indicated number of raw temperature measurement values which are then stored by the data storage element 118. After the desired number of raw measurements is obtained, the control system 114 deactivates the switching elements 142, 144 to electrically decouple the sensing arrangements 110, 112 from the supply voltage node 150, thereby deactivating the sensing arrangements 110, 112. In this manner, the sensing arrangements 110, 112 do not consume current (or power) from the energy source coupled to the supply voltage node 150 while samples are not being obtained. Additionally, the control system 114 ceases operation of the sampling arrangements 120, 122 to maintain the sampling arrangement 120, 122 in a deactivated state. Depending on the embodiment, the control system 114 may obtain the raw measurements concurrently (e.g., by concurrently activating the switching elements 142, 144 and concurrently operating the sampling arrangements 120, 122) or consecutively (e.g., by activating switching element 142 and operating the sampling arrangement 120 to obtain raw pressure measurements while maintaining sampling arrangement 122 and switching element 144 deactivated followed by activating switching element 144 and operating the sampling arrangement 122 to obtain raw temperature measurements while maintaining sampling arrangement 120 and switching element 142 deactivated).

Referring to FIG. 2, and with continued reference to FIG. 1, in an exemplary embodiment, after operating the sensing arrangements to obtain the desired raw measurements, the calibrated measurement process 200 continues by calculating or otherwise determining one or more calibrated measurement values and outputting the one or more calibrated measurement values (tasks 208, 210). In this regard, in an exemplary embodiment, the control system 114 calculates a calibrated pressure measurement value based on the raw pressure measurement values stored by data storage elements 116, the raw temperature measurement values stored by the data storage element 118, and the calibration information stored or otherwise maintained by memory 115. For example, the control system 114 may average the number of raw pressure measurement values stored by the data storage element 116 to obtain an average raw pressure measurement value, average the number of raw temperature measurement values stored by the data storage element 118 to obtain an average raw temperature measurement value, and then calculate the calibrated (or temperature-compensated) pressure measurement value by using the average raw temperature measurement value to influence, adjust, or otherwise modify the average raw pressure measurement value based on the calibration information stored by memory 115. After determining the calibrated pressure measurement value, the control system 114 generates or otherwise provides the calibrated pressure measurement value as an output value at corresponding output terminals (e.g., pads, pins, ports, or the like) that are coupled to the computing device 104 to output the calibrated pressure measurement value. Additionally, in some embodiments, the control system 114 also determines and outputs a calibrated temperature value, for example, by calculating a calibrated (or pressure-compensated) temperature measurement value based on the average raw temperature measurement value, the average raw pressure measurement value, and the calibration information stored by memory 115.

After outputting the calibrated measurement value(s), the calibrated measurement process 200 maintains the sensing arrangements in a deactivated state until receiving signals indicative of a desire to obtain an updated calibrated measurement (task 212). In this regard, at some subsequent time after the initial sampling time, the sensing device 102 and/or control system 114 receives, from the computing device 104, signals indicative of a desire to obtain an updated calibrated measurement value. The calibrated measurement process 200 continues by determining whether previously obtained raw measurement values for one of the physical properties are to be reused for the updated calibrated measurement value (task 214). When the computing device 104 indicates (or the control system 114 determines) that new (or updated) raw temperature measurements are to be obtained in addition to new raw pressure measurements, the control system 114 resets, erases, or otherwise clears the contents of the data storage elements 116, 118 and operates the switching elements 142, 144 and the sampling arrangement 120, 122 to obtain the desired number of pressure and temperature samples and uses the new (or updated) raw pressure and temperature measurement values to determine the updated calibrated pressure measurement value, as described above (tasks 202, 204, 206, 208, 210).

In accordance with one or more embodiments, the computing device 104 determines whether previously obtained raw temperature measurements are to be reused for an updated calibrated pressure measurement value and provides signals to the sensing device 102 indicative of a desire to utilize previous raw temperature measurement samples (or alternatively, a desire not to obtain any new raw temperature measurement samples) for the updated calibrated pressure measurement value in conjunction with the signal(s) requesting an updated calibrated pressure measurement. For example, in one embodiment, the sensing system 100 is implemented in an electronic device including one or more amplifiers, such as a communications device (e.g., a cellular phone or the like), wherein the computing device 104 determines whether to reuse stored raw temperature measurements based on the state of one or more amplifiers. In this regard, the computing device 104 may determine that the stored raw temperature measurements should not be reused when an amplifier has been turned on since the sampling time associated with the stored raw temperature measurements, and conversely, that the stored raw temperature measurements should be reused while the one or more amplifiers are maintained in an off state. In another embodiment, the electronic device includes an accelerometer, a gyroscope, or another inertial sensing arrangement coupled to the computing device 104, wherein the computing device 104 determines whether to reuse stored raw temperature measurements based on the output of the inertial sensing arrangement. In this regard, the computing device 104 may determine that the stored raw temperature measurements should not be reused when the output of the inertial sensing arrangement indicates the electronic device has moved by a non-negligible amount since the sampling time associated with the stored raw temperature measurements, and conversely, that the stored raw temperature measurements should be reused when the electronic device is maintained in a substantially fixed position. In yet another embodiment, the computing device 104 may implement a timer or counter and determine that the previously obtained raw temperature values should be reused when a time between the request for an updated calibrated pressure measurement and a sampling time associated with the raw temperature measurement values stored in the data storage element 118 is less than a threshold amount of time, and conversely, the computing device 104 may determine that new (or updated) raw temperature values should be obtained when the time between the request for the updated calibrated pressure measurement and the sampling time associated with the raw temperature measurement values stored in the data storage element 118 exceeds the threshold amount of time. In another embodiment, the computing device 104 may determine that new (or updated) raw temperature values should be obtained when a difference between calibrated pressure measurement values (e.g., a difference between successive calibrated pressure measurement values or a difference between the most recent calibrated pressure measurement value and the calibrated pressure measurement value obtained at the sampling time corresponding to the stored raw temperature measurement) exceeds a threshold amount. Depending on the embodiment, the computing device 104 may assert a particular signal that indicates a desire not to operate the sensing arrangement 112 and/or obtain any new raw temperature measurements, or alternatively, the computing device 104 may indicate that the number of temperature samples to be obtained for the updated calibrated pressure measurement is equal to zero.

In accordance with another embodiment, the control system 114 may automatically determine that the previously obtained raw temperature values should be used. For example, in a similar manner as described above, the control system 114 may implement a timer or counter and determine that the previously obtained raw temperature values should be reused when a time between the request for an updated calibrated pressure measurement and a sampling time associated with the raw temperature measurement values stored in the data storage element 118 is less than a threshold amount of time, and conversely, the control system 114 may determine that new (or updated) raw temperature values should be obtained when the time between the request for the updated calibrated pressure measurement and the sampling time associated with the raw temperature measurement values stored in the data storage element 118 exceeds the threshold amount of time. In another embodiment, the control system 114 may determine that new (or updated) raw temperature values should be obtained when a difference between calibrated pressure measurement values (e.g., a difference between successive calibrated pressure measurement values or a difference between the most recent calibrated pressure measurement value and the calibrated pressure measurement value obtained at the sampling time corresponding to the stored raw temperature measurement) exceeds a threshold amount.

After determining that an updated calibrated measurement is requested and existing raw measurement values for a sensing arrangement are to be reused for the updated calibrated measurement, the calibrated measurement process 200 continues by operating one sensing arrangement to obtain new (or updated) raw measurements while maintaining the other sensing arrangement in a deactivated state and storing the new (or updated) raw measurement values obtained using that sensing arrangement while maintaining the stored raw measurement values obtained using the deactivated sensing arrangement at a previous time (tasks 216, 218). In this regard, in response to receiving signals from the computing device 104 that are indicative of a desire to obtain an updated calibrated pressure measurement value at a subsequent time using new (or updated) raw pressure measurement values and previous raw temperature values, the control system 114 resets, erases, or otherwise clears the raw pressure measurement values corresponding to a previous sampling time from the data storage element 116 while maintaining the raw temperature measurement values corresponding to an earlier sampling time in the data storage element 118. The control system 114 continues by activating the switching element 142 to provide the supply voltage at node 150 to the sensing arrangement 110 while maintaining the switching element 144 deactivated, thereby decoupling the sensing arrangement 112 from the supply voltage node 150 and preventing the supply voltage from being provided to the sensing arrangement 112, such that the sensing arrangement 112 is maintained in a deactivated state and does not consume current (or power). After activating the switching element 142, the control system 114 operates the sampling arrangements 120 to obtain the indicated number of raw measurements (or samples) for pressure, which are then stored in the data storage elements 116. After operating the desired sensing arrangement to obtain the desired number of new (or updated) measurement values, the calibrated measurement process 200 continues by deactivating the sensing arrangements, as described above (task 206). In this regard, after the control system 114 operates the sampling arrangement 120 to obtain the desired number of new raw pressure measurement values, the control system 114 deactivates the switching element 142 to electrically decouple the sensing arrangement 110 from the supply voltage node 150.

Still referring to FIG. 2, in an exemplary embodiment, the calibrated measurement process 200 continues by calculating or otherwise determining the updated calibrated measurement value in a similar manner as described above (task 208), however, in this situation, the updated calibrated measurement value is determined using the new raw measurement values obtained using one sensing arrangement and the old raw measurement values obtained using another sensing arrangement. In this regard, continuing the above example, the control system 114 calculates an updated calibrated pressure measurement value based on the new (or updated) raw pressure measurement values obtained at or around the most recent (or current) sampling time that are stored by data storage elements 116, the previous raw temperature measurement values obtained at or around an earlier sampling time that are stored by the data storage element 118, and the calibration information stored or otherwise maintained by memory 115. As described above, the control system 114 may average the newly obtained raw pressure measurement values stored by the data storage element 116 to obtain an updated average raw pressure measurement value, and average the raw temperature measurement values stored by the data storage element 118 to obtain an average raw temperature measurement value which is equal to the previous average raw temperature value. In this manner, the control system 114 calculates the updated calibrated pressure measurement value by using the previous average raw temperature measurement value to adjust the updated average raw pressure measurement value in a manner that is indicated by the calibration information stored by memory 115. Thus, by virtue of the raw temperature measurement values (or the average raw temperature measurement value) remaining unchanged, any fluctuations in the updated calibrated pressure measurement value relative to a preceding calibrated pressure measurement value are attributable to fluctuations in the raw pressure measurement values obtained using the sensing arrangement 110. After the updated calibrated measurement value is determined, the calibrated measurement process 200 outputs the updated calibrated measurement value in a similar manner as described above (task 210). In this regard, after determining the updated calibrated pressure measurement value, the control system 114 generates or otherwise provides the updated calibrated pressure measurement value to the computing device 104, as described above.

Referring to FIGS. 1-2, in an exemplary embodiment, the calibrated measurement process 200 repeats as desired throughout operation of the sensing system 100. In this regard, for a subsequent calibrated pressure measurement, whenever the computing device 104 and/or the control system 114 determines that the ambient temperature is unlikely to have changed since the sampling time corresponding to the stored raw temperature measurement values maintained by the data storage element 118, control system 114 operates the switching elements 142 and the sampling arrangement 120 to obtain new raw pressure measurement values and calculates the updated calibrated pressure measurement based on the new raw pressure measurement values obtained at the current sampling time and the old raw temperature measurement values obtained at a previous sampling time. Thus, power that would otherwise be consumed by the temperature sensing arrangement 112 and/or the sampling arrangement 122 is conserved, and any noise that could be introduced into successive calibrated pressure measurements by the temperature sensing arrangement 112 can be effectively eliminated by virtue of the same raw temperature measurement values being used across the successive calibrated pressure measurements. Accordingly, accurate and/or reliable temperature-compensated pressure measurements can be obtained while reducing power consumption and any noise and/or inaccuracies across successive measurements that could be attributable to negligible temperature fluctuations.

For example, in accordance with one embodiment, the control system 114 may receive input signals from the computing device 104 at an initial time ($t_1$) indicating a desire to obtain an initial calibrated pressure measurement value by obtaining a particular number of raw pressure and temperature measurements. In response, the control system 114 activates the switching elements 142, 144 and operates the sampling arrangements 120, 122 to obtain the indicated number of raw measurements (or samples) for pressure and temperature at or around that initial sampling time, which are then stored in the data storage elements 116, 118. After the desired number of raw measurements is obtained, the control system 114 deactivates the switching elements 142, 144 and ceases operation of the sampling arrangements 120, 122. After operating the sensing arrangements to obtain the desired number of raw measurements, the control system 114 calculates an initial calibrated pressure measurement value ($P_{CAL\_1}$) using the equation $P_{CAL\_1} = C_0 + C_1 \times P_{R1} + C_2 \times T_{R1} + C_3 \times P_{R1} \times T_{R1}$, where $P_{R1}$ is the average of the initial raw pressure measurement values stored by the data storage element 116, $T_{R1}$ is the average of the initial raw temperature measurement values stored by the data storage element 118, and $C_0$, $C_1$, $C_2$ and $C_3$ are calibration coefficients for the sensing arrangements 110, 112 that are stored or otherwise maintained in memory 115. After determining the initial calibrated pressure measurement value, the control system 114 generates or otherwise provides the initial calibrated pressure measurement value as an output value at corresponding output terminals that are coupled to the computing device 104 to output the initial calibrated pressure measurement value ($P_{CAL\_1}$). At some subsequent time ($t_2$) after the initial sampling time ($t_1$), the control system 114 receives, from the computing device 104, signals indicative of a desire to obtain an updated calibrated pressure measurement value while reusing the initial raw temperature measurement values. In response, the control system 114 clears the data storage element 116, then activates switching element 142 and operates sampling arrangement 120 to obtain the indicated number of raw measurements (or samples) for pressure while maintaining the switching element 144 and sampling arrangement 122 in a deactivated state. After the desired number of raw pressure measurements is obtained, the control system 114 deactivates the switching element 142, ceases operation of the sampling arrangement 120, and calculates an updated calibrated pressure measurement value ($P_{CAL\_2}$) using the equation $P_{CAL\_2}=C_0+C_1 \times P_{R2}+C_2 \times T_{R1}+C_3 \times P_{R2} \times T_{R1}$, where $P_{R2}$ is the average of the updated raw pressure measurement values stored by the data storage element 116 that were sampled or otherwise measured at or around the most recent sampling time ($t_2$) and $T_{R1}$ is the average of the stored raw temperature measurement values that were previously sampled or otherwise measured at or around the initial sampling time ($t_1$) stored by the data storage element 118. In this manner, the previously obtained raw temperature measurement values influence the updated calibrated pressure measurement value which is output by the sensing device 102. Similarly, at some subsequent time ($t_3$), the control system 114 may receive signals indicative of a desire to obtain another updated calibrated pressure measurement value while reusing the initial raw temperature measurement values and calculate and output an updated calibrated pressure measurement value ($P_{CAL\_3}$) using the equation $P_{CAL\_3}=C_0+C_1 \times P_{R3}+C_2 \times T_{R1}+C_3 \times P_{R3} \times T_{R1}$, where $P_{R3}$ is the average of the updated raw pressure measurement values stored by the data storage element 116 that were sampled or otherwise measured at or around the most recent sampling time ($t_3$) and $T_{R1}$ is the average of the stored raw temperature measurement values that were previously sampled or otherwise measured at or around the initial sampling time ($t_1$) stored by the data storage element 118. As described above, power that would otherwise be consumed by the temperature sensing arrangement 112 and/or the sampling arrangement 122 is conserved, and the temperature sensing arrangement 112 does not introduce any noise into the successive calibrated pressure measurements by virtue of the same raw temperature measurement values being used across the successive calibrated pressure measurements.

For the sake of brevity, conventional techniques related to pressure sensing, temperature sensing, calibration methods, semiconductor and/or integrated circuit fabrication, MEMS devices, device packaging, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures may depict direct electrical connections between circuit elements and/or terminals, alternative embodiments may employ intervening circuit elements and/or components while functioning in a substantially similar manner.

In conclusion, systems, devices, and methods configured in accordance with example embodiments of the invention relate to:

In an exemplary embodiment, an apparatus for a sensing device is provided. The sensing device includes a first sensing arrangement to measure a first property and provide one or more measured values for the first property, a second sensing arrangement to measure a second property, a storage element coupled to the second sensing arrangement to maintain a stored value for the second property measured by the second sensing arrangement, and a control system coupled to the first sensing arrangement and the storage element to determine one or more calibrated measurement values for the first property using the one or more measured values for the first property from the first sensing arrangement and the stored value for the second property. In one embodiment, the sensing device further comprises a first switching element coupled between the second sensing arrangement and a reference voltage node. In another embodiment, the sensing device further comprises a second switching element coupled between the first sensing arrangement and the reference voltage node, and the control system is coupled to the first switching element and the second switching element to activate the second switching element to operate the first sensing arrangement to obtain the one or more measured values and deactivate the first switching element to maintain the second sensing arrangement in a deactivated state while operating the first sensing arrangement to obtain the one or more measured values. In yet another embodiment, the first sensing arrangement comprises a pressure sensing arrangement and the second sensing arrangement comprises a temperature sensing arrangement. In another embodiment, the stored value is measured by the second sensing arrangement at a first time and the one or more measured values are measured by the first sensing arrangement after the first time. In a further embodiment, the control system operates the first sensing arrangement to obtain the one or more measured values of the first property in response to receiving a first signal indicative of a desire to obtain a calibrated measurement of the first property after the first time. In yet another embodiment, the first sensing arrangement, the second sensing arrangement, the storage element, and the control system are encapsulated in a single device package. In another embodiment, the first sensing arrangement is formed on a first die and the second sensing arrangement, the storage element, and the control system are formed on a second die.

In accordance with another exemplary embodiment, a method is provided that involves storing a first measured value for a first property obtained using a first sensing arrangement at a first time, receiving an indication of a desire to obtain a calibrated measurement for a second property after the first time, and after receiving the indication, operating a second sensing arrangement to obtain one or more measured values for the second property and determining a calibrated measurement value for the second property using the first measured value and the one or more measured values for the second property. In one embodiment, the method further comprises deactivating the first sensing arrangement prior to receiving the indication and maintaining the first sensing arrangement in a deactivated state while operating the second sensing arrangement to obtain the one or more measured values for the second property. In a further embodiment, operating the second sensing arrangement comprises providing a supply voltage to the second sensing arrangement and deactivating the first sensing arrangement comprises decoupling the supply voltage from the first sensing arrangement. In another embodiment, the method further comprises receiving a second indication of a desire to utilize the first measured value for the calibrated measurement, wherein maintaining the first sensing arrangement in the deactivated state comprises maintaining the first sensing arrangement in the deactivated state in response to receiving the second indication. In accordance with another embodiment, the first sensing arrangement comprises a temperature sensing arrangement and the second sensing arrangement comprises a pressure sensing arrangement, wherein storing the first measured value comprises storing a temperature value measured by the temperature sensing arrangement at the first time, operating the second sensing arrangement comprises operating the pressure sensing arrangement to obtain a pressure value measured by the pressure sensing arrangement, and determining the calibrated measurement value comprises determining a calibrated pressure value based on the pressure value in a manner that is influenced by the temperature value measured at the first time. In yet another embodiment, the indication is received at a second time, wherein determining the calibrated measurement value comprises determining the calibrated measurement value for the second property corresponding to the second time using the one or more measured values sampled at or around the second time and the first measured value sampled at or around at the first time. In another embodiment, storing the first measured value comprises storing the first measured value by a sensing device including the first sensing arrangement and the second sensing arrangement and receiving the indication comprises receiving the indication by the sensing device, wherein the sensing device outputs the calibrated measurement value. In accordance with yet another embodiment, the method further comprises receiving a second indication of a desire to obtain a second calibrated measurement for the second property after the receiving the indication, and after receiving the second indication, operating the second sensing arrangement to obtain one or more updated measurement values for the second property and determining a second calibrated measurement value for the second property using the first measured value and the one or more updated measurement values for the second property.

In yet another exemplary embodiment, a system is provided that includes a computing device to provide a signal indicative of a desire to obtain a calibrated measurement for a first property and a sensing device coupled to the computing device to receive the signal. The sensing device comprises a pressure sensing arrangement, a temperature sensing arrangement, a storage element to maintain one or more measured temperature values from the temperature sensing arrangement, and a control system coupled to the pressure sensing arrangement and the storage element to operate the pressure sensing arrangement to obtain one or more measured pressure values in response to receiving the signal, determine a calibrated pressure measurement value using the one or more measured pressure values and the one or more measured temperature values, and provide the calibrated pressure measurement value to the computing device. In one embodiment, the sensing device includes a second storage element to maintain the one or more measured pressure values, and the control system is coupled to the second storage element to obtain the one or more measured pressure values. In another embodiment, the one or more measured temperature values are obtained prior to receiving the signal.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A sensing device comprising:
    a first sensing arrangement to measure a first property and provide one or more raw measurement values for the first property;
    a first switching element coupled electrically in series between a reference voltage node and the first sensing arrangement;
    a second sensing arrangement to measure a second property;
    a second switching element coupled electrically in series between the reference voltage node and the second sensing arrangement;
    a storage element coupled to the second sensing arrangement to maintain a stored raw measurement value for the second property measured by the second sensing arrangement at a previous sampling time; and
    a control system coupled to the first sensing arrangement, the second sensing arrangement, and the storage element to:
        activate the first switching element to activate and sample the first sensing arrangement to obtain the one or more raw measurement values at a current sampling time;
        deactivate the second switching element to maintain the second sensing arrangement in a deactivated state while the first sensing arrangement is sampled to obtain the one or more raw measurement values, and
        determine one or more calibrated measurement values for the first property using the one or more raw measurement values for the first property from the first sensing arrangement and the stored raw measurement value for the second property.

2. The sensing device of claim 1, wherein the first sensing arrangement comprises a pressure sensing arrangement and the second sensing arrangement comprises a temperature sensing arrangement.

3. The sensing device of claim 1, wherein the control system operates the first sensing arrangement to obtain the one or more raw measurement values of the first property in response to receiving a first signal after the previous sampling time.

4. The sensing device of claim 1, wherein the first sensing arrangement, the second sensing arrangement, the storage element, and the control system are encapsulated in a single device package.

5. The sensing device of claim 1, wherein the first sensing arrangement is formed on a first die and the second sensing arrangement, the storage element, and the control system are formed on a second die.

6. The sensing device of claim 5, wherein the first switching element and the second switching element are formed on the second die.

7. The sensing device of claim 1, further comprising:
a first sampling arrangement coupled to an output of the first sensing arrangement to sample a first output signal of the first sensing arrangement indicative of the first property; and
a second sampling arrangement coupled to an output of the second sensing arrangement to sample a second output signal of the second sensing arrangement indicative of the second property, wherein:
the storage element is coupled to an output of the second sampling arrangement;
the control system is coupled to the first sampling arrangement and the second sampling arrangement to operate the first sampling arrangement to obtain the one or more raw measurement values at the current sampling time and maintain the second sampling arrangement in a deactivated state while the first sampling arrangement is operated at the current sampling time.

8. The sensing device of claim 1, further comprising an input terminal coupled to the control system to receive an indication to reuse the stored raw measurement value for the second property, wherein in response to the indication, the control system activates the first switching element and maintains the second switching element in a deactivated state while the first sensing arrangement is sampled.

9. A method comprising:
storing a first raw measurement value for a first property obtained using a first sensing arrangement at a first time, resulting in a stored raw measurement value for the first property;
deactivating a first switching element coupled electrically in series between the first sensing arrangement and a reference voltage node to deactivate the first sensing arrangement;
after deactivating the first sensing arrangement, receiving an indication to obtain a calibrated measurement for a second property after the first time; and
after receiving the indication:
activating a second switching element coupled electrically in series between a second sensing arrangement and the reference voltage node;
sampling the second sensing arrangement to obtain one or more raw measurement values for the second property;
maintaining the first switching element in a deactivated state to maintain the first sensing arrangement in a deactivated state while sampling the second sensing arrangement to obtain the one or more raw measurement values for the second property; and
determining a calibrated measurement value for the second property using the stored raw measurement value and the one or more raw measurement values for the second property.

10. The method of claim 9, wherein:
sampling the second sensing arrangement comprises providing a supply voltage to the second sensing arrangement; and
deactivating the first sensing arrangement comprises decoupling the supply voltage from the first sensing arrangement.

11. The method of claim 9, further comprising receiving a second indication to utilize the stored raw measurement value for the calibrated measurement, wherein maintaining the first sensing arrangement in the deactivated state comprises maintaining the first sensing arrangement in the deactivated state in response to receiving the second indication.

12. The method of claim 9, the first sensing arrangement comprising a temperature sensing arrangement and the second sensing arrangement comprising a pressure sensing arrangement, wherein:
storing the first raw measurement value comprises storing a temperature value measured by the temperature sensing arrangement at the first time;
sampling the second sensing arrangement comprises sampling the pressure sensing arrangement to obtain a pressure value measured by the pressure sensing arrangement; and
determining the calibrated measurement value comprises determining a calibrated pressure value based on the pressure value in a manner that is influenced by the temperature value measured at the first time.

13. The method of claim 9, the indication being received at a second time, wherein determining the calibrated measurement value comprises determining the calibrated measurement value for the second property corresponding to the second time using the one or more raw measurement values sampled at or around the second time and the stored raw measurement value sampled at or around at the first time.

14. The method of claim 9, wherein:
storing the first raw measurement value comprises storing the first raw measurement value by a sensing device including the first sensing arrangement and the second sensing arrangement; and
receiving the indication comprises receiving the indication by the sensing device, wherein the sensing device outputs the calibrated measurement value.

15. The method of claim 9, wherein:
storing the first raw measurement value comprises storing the first raw measurement value by a sensing device including the first sensing arrangement and the second sensing arrangement;
deactivating the first sensing arrangement comprises the control system decoupling a supply voltage from the first sensing arrangement;
receiving the indication comprises a control system of the sensing device receiving the indication; and
sampling the second sensing arrangement comprises the control system operating a sampling arrangement coupled to an output of the second sensing arrangement to obtain the one or more raw measurement values.

16. A system comprising:
a computing device to provide an indication to obtain a calibrated measurement for a first property; and a sensing device coupled to the computing device to receive the indication, the sensing device comprising:

a pressure sensing arrangement;

a temperature sensing arrangement;

a first switching element coupled electrically in series between the pressure sensing arrangement and a reference voltage node;

a second switching element coupled electrically in series between the temperature sensing arrangement and the reference voltage node;

a storage element to maintain one or more raw temperature measurement values from the temperature sensing arrangement at a previous sampling time; and a control system coupled to the first switching element, the second switching element, the pressure sensing arrangement and the storage element to activate the first switching element and sample the pressure sensing arrangement to obtain one or more raw pressure measurement values in response to receiving the indication, deactivate the second switching element and maintain the second switching element in a deactivated state based on the indication to maintain the temperature sensing arrangement in a deactivated state while the one or more raw pressure measurement values are obtained, determine a calibrated pressure measurement value using the one or more raw pressure measurement values and the one or more raw temperature measurement values, and provide the calibrated pressure measurement value to the computing device.

17. The system of claim 16, wherein:

the sensing device includes a second storage element to maintain the one or more raw pressure measurement values; and the control system is coupled to the second storage element to obtain the one or more raw pressure measurement values.

18. The system of claim 16, the computing device providing and a second indication to reuse a stored raw temperature measurement, the control system maintaining the temperature sensing arrangement in the deactivated state while the one or more raw pressure measurement values are obtained in response to the second indication, wherein the one or more raw temperature measurement values are obtained prior to receiving the indication.

19. The system of claim 16, wherein the pressure sensing arrangement is formed on a first die and the temperature sensing arrangement, the first switching element, the second switching element, the storage element, and the control system are formed on a second die.

20. The system of claim 19, wherein:

the first die comprises a pressure sensor die;

the second die comprises an application-specific integrated circuit (ASIC) die; and the pressure sensor die and the ASIC die are encapsulated in a single device package.

* * * * *